April 20, 1937.  F. L. ORR ET AL  2,077,567
DEMOUNTABLE WHEEL
Filed May 29, 1934  2 Sheets-Sheet 2
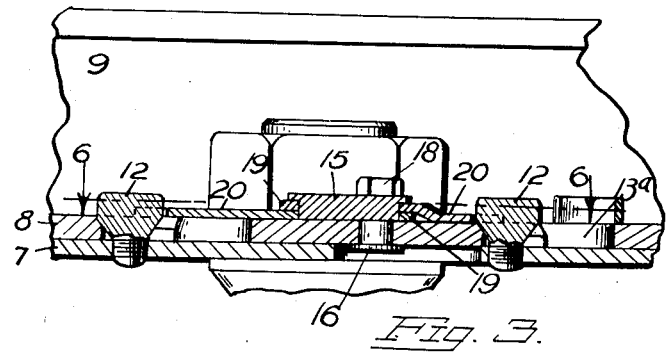
Fig. 3.
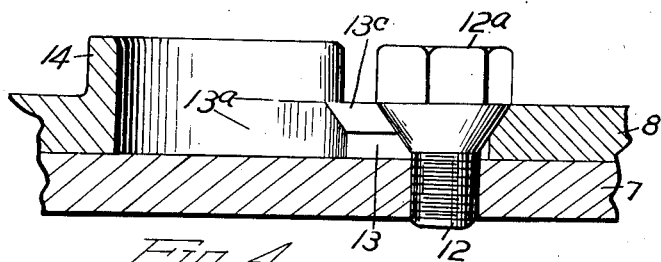
Fig. 4.
Fig. 5.
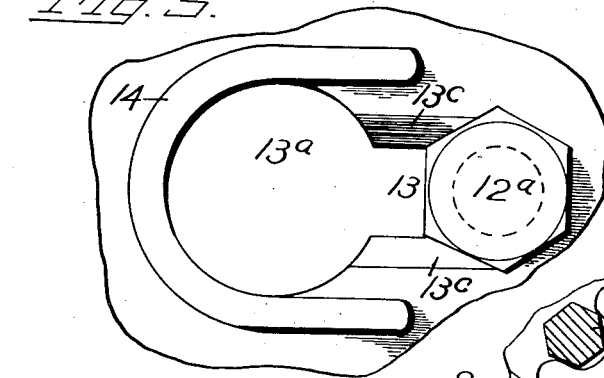
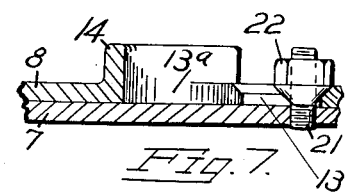
Fig. 7.
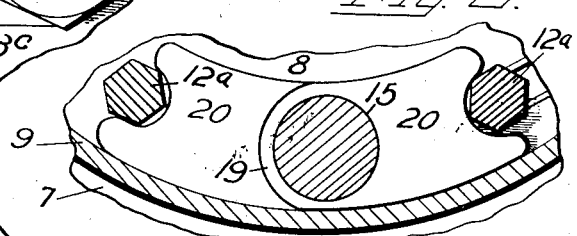
Fig. 6.
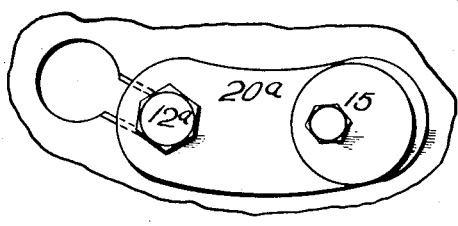
Fig. 8.
INVENTOR.
F. L. ORR and R. R. WATTELET
BY
ATTORNEY.

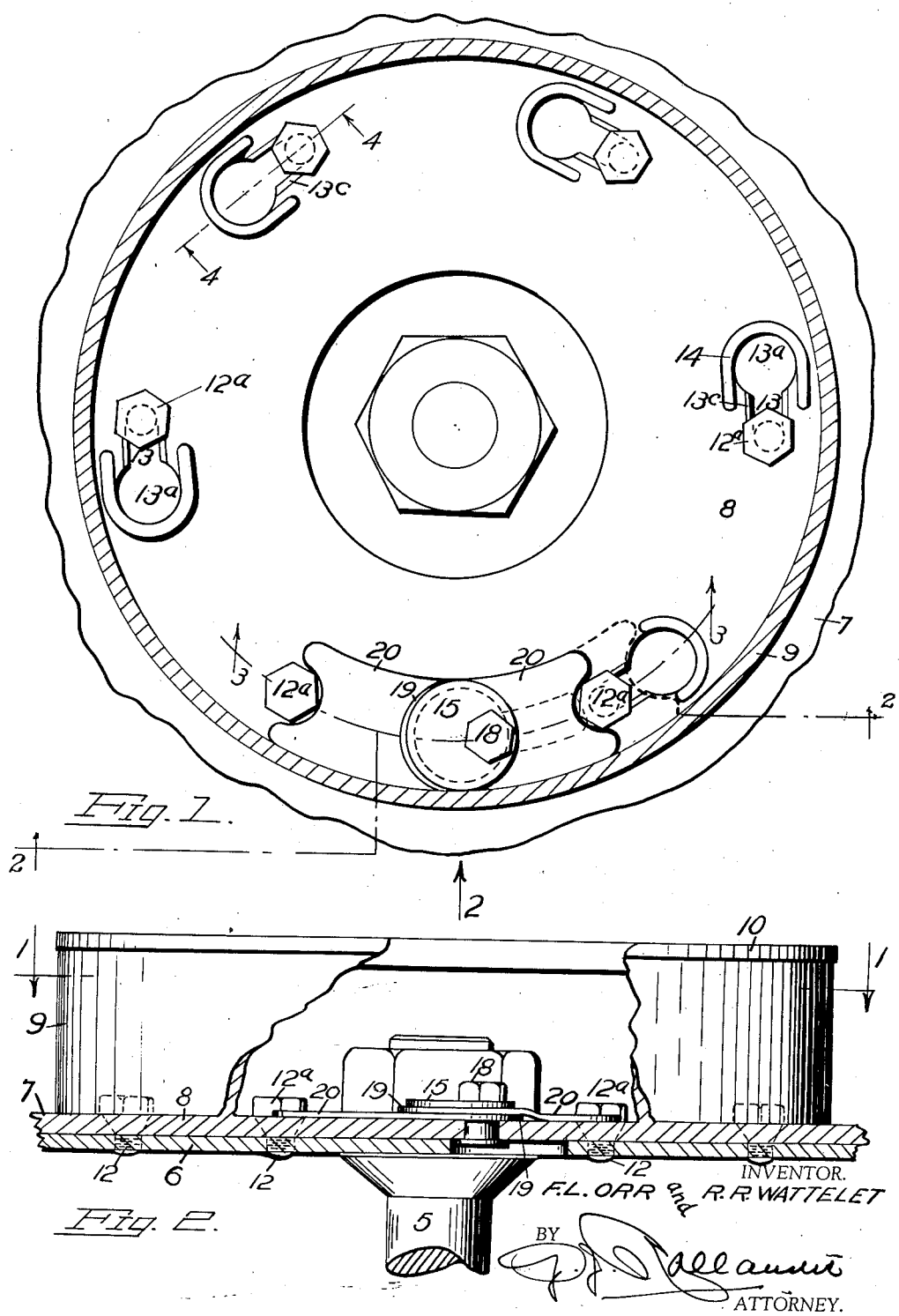

Patented Apr. 20, 1937

2,077,567

UNITED STATES PATENT OFFICE 2,077,567

DEMOUNTABLE WHEEL

Francis L. Orr, Denver, and Raymond R. Wattelet, Superior, Colo., assignors of one-third to Anthony E. Heichemer, Denver, Colo.

Application May 29, 1934, Serial No. 728,066

7 Claims. (Cl. 301—9)

This invention relates to demountable vehicle wheels, its primary object being to provide a simple, secure, and dependable means for fastening a wheel in rigid connection with a brake-drum or other part of a vehicle axle, which may be adjusted to permit the removal of the wheel by a limited rotary movement thereof.

Further objects of the invention reside in the specific construction of the fastening means, in the provision of a locking element which functions in securing the wheel in place and also in effecting the rotary movement of the wheel, and in other details of construction and novel and advantageous combinations and arrangements of parts, as will be fully brought out in the course of the following description.

In the accompanying drawings, in the several views of which like parts are similarly designated, Figure 1 is a view taken along line 1—1, Figure 2, a portion being shown in section;

Figure 2 is a side elevation looking in the direction of arrow 2 in Figure 1, a portion being shown in section taken along line 2—2, Figure 1;

Figure 3 is a fragmentary section on the line 3—3 of Figure 1,

Figure 4 is an enlarged section taken on the line 4—4 of Figure 1,

Figure 5 is a plan view of the parts shown in Figure 4,

Figure 6 is a section on the line 6—6 of Figure 3,

Figure 7 is a sectional view similar to that of Figure 4, showing a modified construction of the screw devices included in the fastening means, and Figure 8 is a plan view showing a modified construction of the locking device illustrated in Figures 3 and 6.

Referring further to the drawings, a wheel axle 5 carries at an end thereof a brake-drum 6 to which a wheel 7 is fastened by the means comprising the subject matter of the present invention.

It will be apparent without further illustration that a head other than that provided by the brake-drum may be applied at the end of the axle or its equivalent for fastening the wheel in place and that while the wheel as shown in the drawing is of the so-called disk type, the invention is applicable to any vehicle wheel, irrespective of its specific construction.

The wheel, however, must necessarily have a hub 8 for the application of the fastening means, and in the construction shown in the drawings, this hub has a cylindrical housing 9, welded or otherwise secured thereto and which encloses the fastening means and which is normally closed by a hub cap, indicated at 10.

It is to be understood, however, that this housing and the hub cap are not essential parts of the invention.

The axle head, which in the illustration is represented by the brake-drum 6, has a flat face and is provided with a series of equidistantly spaced screw-threaded bolt holes, arranged in a circle concentric with the axle.

Screwed into these holes are bolts 12 having at their outer ends heads 12a, which are hexagonal or otherwise faced for the application of a wrench.

The hub of the wheel has a series of keyhole slots 13 circularly arranged in correspondence with the bolts on the axle head, so that the bolts passing through the respective keyhole slots may simultaneously occupy corresponding ends thereof.

The enlargements 13a at one end of the slots are of sufficient diameter to permit of the free passage of the heads of the bolts for the removal of the wheel, while when the bolts occupy the opposite ends of the slot and are tightened to the face of the hub, they fasten the wheel rigidly upon the head 6.

The slots 13 are preferably beveled at their outer edges as shown at 13c, and the heads of the bolts are correspondingly beveled at their under sides. Frictional contact of the bolts with the edges of the slots during adjustment of the wheel relative to the axle head is thereby reduced to the minimum.

The wheel hub has upon its face around the enlarged ends 13a of its keyhole slots outwardly projecting rims or flanges 14 which function as guards to prevent the heads of the bolts from passing beyond said ends over the face of the hub and thereby interfere with the removal of the wheel. The rims 14 are concentric with the enlarged ends 13a for an angular distance of 180 degrees and have parallel ends that overlap the slots for a short distance. Rims 14 form guides which direct the heads of the bolts into the centers of the enlarged openings 13a. The rims prevent the wheel from slipping sideways and catching under the heads of the bolts.

It will be understood from the foregoing description of the fastening means that normally the bolts occupy the small ends of their respective slots, and are screwed home upon the face of the wheel hub to fasten the wheel securely in place upon the brake-drum or other head of the axle. When it is desired to remove the wheel, the bolts are loosened and the wheels are turned until the bolts register with the enlarged ends of their slots, when the wheel is free to be moved outwardly away from the head to which it was attached.

While the above-described fastening means is sufficient in itself to secure the wheel upon the axle head, it is desirable to provide a locking element which cooperates with the fastening means in preventing accidental loosening of the wheel as might possibly occur in long usage.

This element as shown in section in Figure 3 of the drawings, comprises an eccentric 15 mounted for rotation upon the face of the wheel hub by means of a stud 16. A hexagon head 18 at the upper side of the eccentric affords means for its rotation by the use of a wrench. The eccentric is circumferentially recessed to provide a bearing-portion, around which are movably fitted the annular heads 19 of two straps 20 which at their outer ends are grooved to embrace the heads 12a of the two bolts 12 of the fastening means, between which the locking element is disposed. When these bolts are in their operative position in the small ends of their respective slots, these straps forcibly driven into contact with their heads will lock the hub against accidental rotary movement in either direction, and the attachment of the wheel to the axle head is thus made secure, independently of the bolts.

At the same time, the locking element provides a means for moving the wheel upon the head after the bolts are loosened.

This action of the locking element is particularly of advantage on the front wheels of a motor vehicle, having brakes on the rear wheels only the axles of which cannot be held against rotation by a braking action, as in the case of rear wheels, whose rotary movement is controlled by an emergency brake. The locking element thus performs the two-fold function of safeguarding against accidental loosening of the wheel and of forcibly effecting its rotary movement for subsequent removal.

It is to be understood that the axle head may be of any desired form and construction, as long as it is adapted for the connection of the wheel hub by means of the bolts 12 and that under the term "axle" is included any rotary part upon which the wheel is secured.

This applies particularly to the rotary parts of so-called knee-action connections between the front wheels of modern motor vehicles and the stationary front axle of the same.

Having thus described our invention, we desire it understood that changes in details of construction and in the cooperative arrangement of the parts and elements comprised in the invention may be availed of within the scope thereof as defined in the hereunto appended claims. For example, threaded studs 21 fastened to the axle head and nuts 22 on the studs, as shown in Figure 7, may be used as an equivalent of the screw bolts 12, and by providing one of the straps 20 of the locking element, with a head encircling the head of one of the fastening devices, as shown in Figure 8, where the modified strap has been indicated by reference character 20a, the other strap may be omitted.

What we claim and desire to secure by Letters Patent is:

1. A demountable wheel construction comprising in combination with a rotary element, a wheel having keyhole slots in a circle concentric with its axis, screw devices on the rotary element, passing through the slots and having heads normally engaging a face of the part of the wheel in which the slots are formed and adapted to pass freely through enlarged ends of the slots, when by rotation of the wheel said ends are brought into register with said heads, and outwardly projecting rims on said face, curved about and concentric with the enlarged ends of the slots for an angular distance of 180 degrees, the ends of the rims being parallel and overlapping the slots a short distance, said rims forming guides and centering means for the heads of the screw devices.

2. A demountable wheel construction comprising in combination with a rotary element, a wheel having keyhole slots in a circle concentric with its axis, screw devices on the rotary element, passing through the slots and having heads normally engaging a face of the part of the wheel in which the slots are formed and adapted to pass freely through enlarged ends of the slots, when by rotation of the wheel said ends are brought into register with said heads, and a locking device carried by the wheel, comprising an eccentric mounted for rotation on the wheel and a strap having a portion enclosing the eccentric, the other end of the strap having an opening for the reception of the head of a screw device, whereby the rotation of the eccentric can produce either a tensional or a compression strain in the strap.

3. A demountable wheel construction comprising in combination with a rotary element, a wheel having keyhole slots in a circle concentric with its axis, screw devices on the rotary element, passing through the slots and having heads normally engaging a face of the part of the wheel in which the slots are formed and adapted to pass freely through enlarged ends of the slots, when by rotation of the wheel said ends are brought into register with said heads, and a locking element including an eccentric movable on the wheel, and a strap having a portion enclosing the eccentric so as to be moved by rotation thereof and having one end in engagement with one of said screw devices.

4. A demountable wheel construction comprising in combination with a rotary element, a wheel having keyhole slots in a circle concentric with its axis, screw devices on the rotary element, passing throgh the slots and having heads normally engaging a face of the part of the wheel in which the slots are formed and adapted to pass freely through enlarged ends of the slots, when by rotation of the wheel said ends are brought into register with said heads, and a locking element including an eccentric movable on the wheel, and two straps operated simultaneously by the movement of the eccentric, each strap being positioned to engage with one of said screw devices.

5. A demountable wheel construction comprising in combination with a rotary element, a wheel having keyhole slots in a circle concentric with its axis, screw devices on the rotary element, passing through the slots and having heads normally engaging a face of the part of the wheel in which the slots are formed and adapted to pass freely through enlarged ends of the slots, when by rotation of the wheel said ends are brought into register with said heads, and a leverage element carried by the wheel to effect a rotary movement of the wheel in either direction relative to the rotary element.

6. A demountable wheel construction comprising in combination with a rotary element, a wheel having keyhole slots in a circle concentric with its axis, screw devices on the rotary element, passing through the slots and having heads normally engaging a face of the part of the wheel in which the slots are formed and adapted to pass freely through enlarged ends of the slots, when by rotation of the wheel said ends are brought into register with said heads, and a leverage element to effect a rotary movement of the wheel relative to the rotary element in either direction by engagement with either one of two of said screw devices.

7. A demountable wheel construction comprising in combination with a rotary element, a wheel having keyhole slots in a circle concentric with its axis, screw devices on the rotary element passing through the keyhole slots and having heads normally engaging a face of the part of the wheel in which the slots are formed and of a size to pass through the large end of the slots, when brought in register therewith, and flanges partially surrounding the larger ends of the keyhole slots for guiding the passage of the screw heads through the slots.

FRANCIS L. ORR.
RAYMOND R. WATTELET